United States Patent [19]

Ozeki et al.

[11] 4,400,055

[45] Aug. 23, 1983

[54] OPTICAL POWER DISTRIBUTOR AND METHOD FOR MANUFACTURING THE SAME

[75] Inventors: Takeshi Ozeki, Tokyo; Shigeru Ohshima, Funabashi, both of Japan

[73] Assignee: Tokyo Shibaura Denki Kabushiki Kaisha, Kawasaki, Japan

[21] Appl. No.: 363,400

[22] Filed: Mar. 29, 1982

Related U.S. Application Data

[63] Continuation of Ser. No. 129,749, Mar. 12, 1980, abandoned.

[30] Foreign Application Priority Data

May 8, 1979 [JP] Japan ................... 54-55867

[51] Int. Cl.³ ........................................... G02B 5/172
[52] U.S. Cl. ........................... 350/96.15; 350/96.16
[58] Field of Search .................... 350/96.15, 96.16

[56] References Cited

U.S. PATENT DOCUMENTS

| | | | |
|---|---|---|---|
| 4,083,625 | 4/1978 | Hudson | 350/96.15 |
| 4,135,779 | 1/1979 | Hudson | 350/96.15 |
| 4,291,940 | 9/1981 | Kawasaki et al. | 350/96.15 |

FOREIGN PATENT DOCUMENTS

| | | | |
|---|---|---|---|
| 2812346 | 9/1978 | Fed. Rep. of Germany | 350/96.15 |
| 53127750 | 3/1977 | Japan | |
| 53124450 | 4/1977 | Japan | |
| 5322762 | 9/1979 | Japan | 350/96.15 |

OTHER PUBLICATIONS

Kawasaki et al, "Low-Loss Access Coupler for Multimode Optical Fiber Distribution Networks," *Applied Optics*, vol. 16, No. 7, Jul. 1977, pp. 1794-1795.

*Primary Examiner*—John D. Lee
*Attorney, Agent, or Firm*—Oblon, Fisher, Spivak, McClelland & Maier

[57] ABSTRACT

A pair of optical fibers are arranged parallel in contact. A portion of the pair is thermally fused to form a biconical taper waist. The biconical taper waist is cleaved at its thinnest portion, thus dividing the pair of optical fibers into two sections each having a tapered portion at one end. One of the sections is rotated by 90°, and its tapered portion is butted on the tapered portion of the other section, while keeping the axes of both sections aligned. The tapered portions thus butted are then thermally fused to couple the sections together, thus providing an optical power distributor. At the thinnest portion of the waist, one of the cores of one section overlaps both cores of the other section.

7 Claims, 12 Drawing Figures

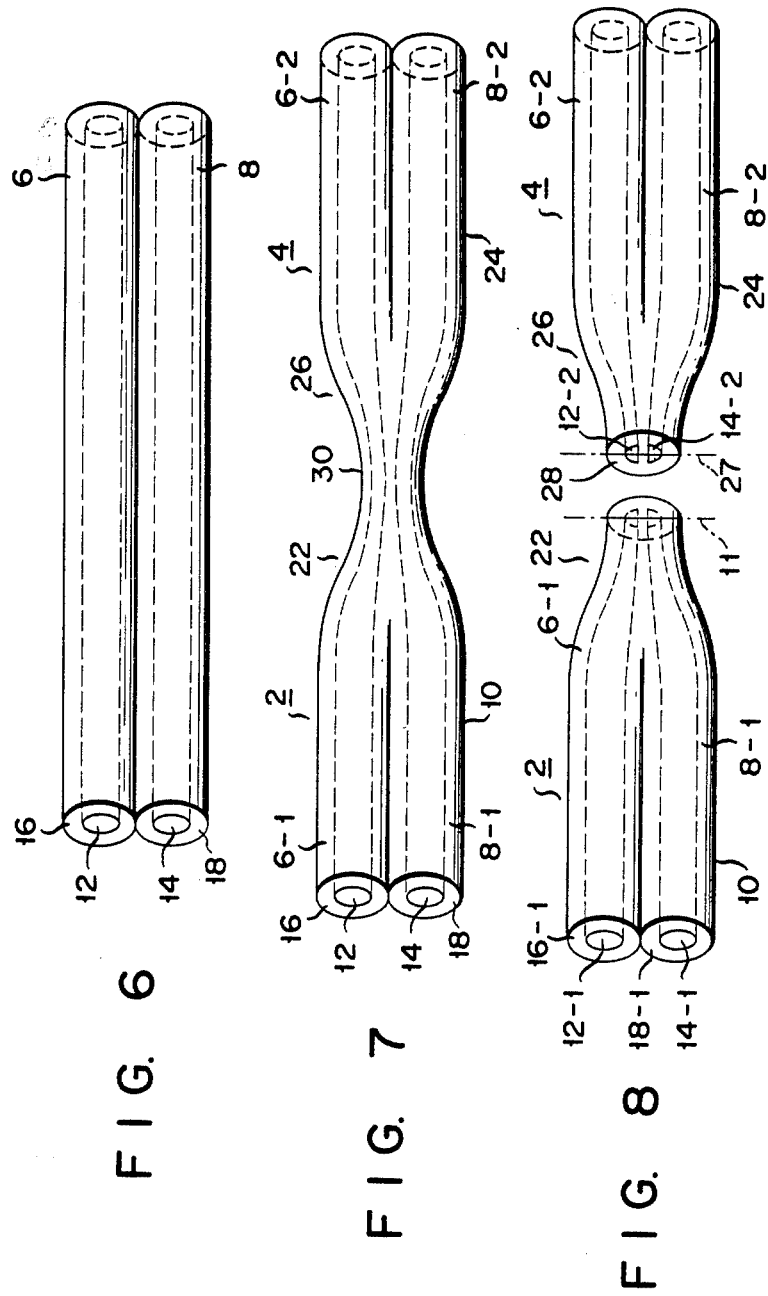

OPTICAL POWER DISTRIBUTOR AND METHOD FOR MANUFACTURING THE SAME

This is a continuation, of application Ser. No. 129,749, filed Mar. 12, 1980 (now abandoned).

This invention relates to an optical power distributor and a method for manufacturing the same.

Takeshi Ozeki, one of the inventors of this invention filed U.S. patent application Ser. No. 888,358 on Mar. 20, 1978, claiming priority based on Japanese Patent Application No. 52-31032 which was laid open on Nov. 8, 1978 under Disclosure No. 53-127750. British Patent Application No. 11359/78 which corresponds to the U.S. application was filed on Mar. 22, 1978. The U.S. application is abandoned, whereas the British application has been allowed and British Pat. No. 1,551,790 has issued thereon. The U.S. application and the British patent disclose a light distributor which comprises a number of optical fibers thermally fused together to form a biconical tapered section.

In the tapered section of the above-mentioned light distributor, light of higher order mode is converted into cladding mode light and distributed to the individual optical fibers and light of lower order mode undergoes evanecent wave coupling and is then distributed to the individual optical fibers. An optical power distributor of this type is advantageous because it can couple higher order mode light and lower order mode light. It is also advantageous because its optical coupling loss is small and because it can be easily manufactured. However, it is disadvantageous. Indeed it distributes higher order mode light substantially equal to the individual optical fibers, but it fails to distribute lower order mode light substantially equal to the individual optical fibers. If lower order mode light is to be distributed substantially equal to the optical fibers, the taper ratio of the tapered section has to be increased, and the tapered section, i.e. optical mixing section, has to be made longer. If the taper ratio is made larger and if the tapered section is made longer, the optical power distributor will have a larger insertion optical loss.

It is an object of this invention to provide an optical power distributor which can distribute both higher order mode light and lower order mode light substantially at a predetermined ratio.

Another object of this invention is to provide a method for manufacturing an optical power distributor which can distribute both higher order mode light and lower order mode light substantially at a predetermined ratio.

An optical power distributor according to this invention comprises first and second sections each of which consists of at least two optical fibers thermally fused at one end portion, thus forming an end portion consisting of a united cladding having a circular sectional profile and at least two cores deformed relatively elongated sectional profile and packed in the cladding, the end portion of said first section and the end portion of said second section being spliced by means of thermal fusing in such a manner that at least one core of said first section overlaps at least two cores of said second section, whereby optical power is distributed through a splice plane where said first and second sections are butted on each other.

Further, a method for manufacturing optical power distributors according to this invention comprises a step of arranging a number of optical fibers on the same plane and parallel in contact, a step of heating the optical fibers at a portion and pulling the optical fibers at both ends, thus forming a biconical taper waist, a step of cleaving the optical fibers at the waist into a first section and a second section, a step of aligning the axes of the first and second sections, rotating one of the first and second sections by a predetermined angle and butting ends of the first and second sections on each other, and a step of heating the butting ends of the first and second sections, thus thermally fusing the first and second sections together.

This invention can be more fully understood from the following detailed description when taken in conjunction with the accompanying drawings, in which.

Figure 1:
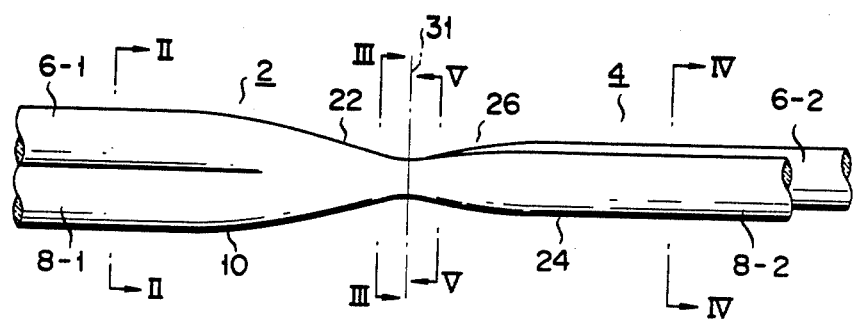
FIG. 1 is a perspective view of an optical power distributor according to this invention.
Figure 10:
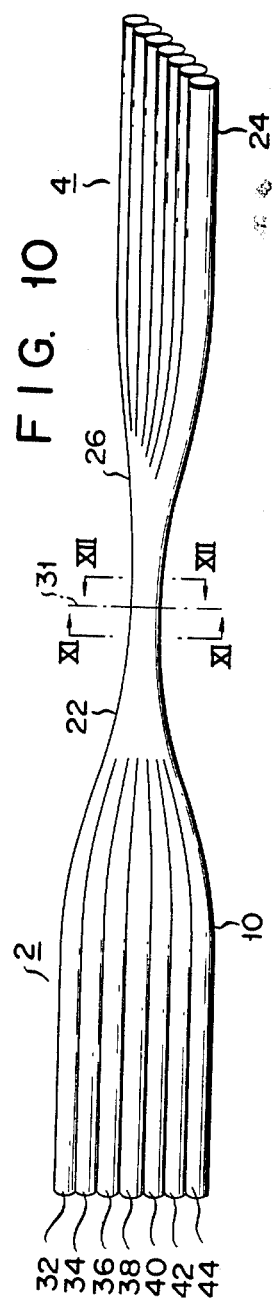
Figure 11:
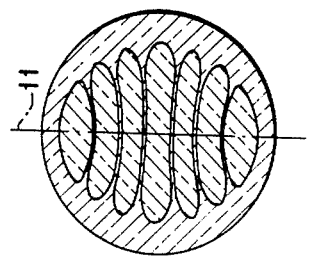

FIGS. 6 to 9 schematically illustrate how the optical power distributor of FIG. 1 is manufactured;

FIG. 10 is a perspective view of a star coupler, another embodiment of this invention;

FIG. 11 is a cross sectional view taken along line XI—XI in FIG. 10; and

Figure 12:
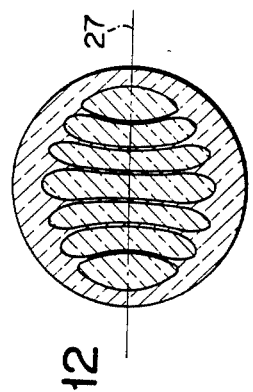

FIG. 12 is a cross sectional view taken along line XII—XII in FIG. 10.

FIG. 1 shows an optical power distributor (or optical directional coupler) according to this invention. The optical power distributor is constituted by a pair of optical fibers in such a way as will later be described. Instead, it may be constituted by three or more optical fibers. Further it may be constituted either by optical fibers of step index type or by optical fibers of graded index type.

More specifically, the optical power distributor shown in FIG. 1 comprises a first section 2 and a second section 4. The first section 2 is constituted by a pair of optical fibers 6-1 and 8-1, for example multimode fibers. Similarly, the second section 4 is constituted by a pair of optical fibers 6-2 and 8-2, for example multimode fibers. Each of the optical fibers is constituted by a core having a large refractive index and a cladding having a small refractive index and covering the core.

Figure 2:
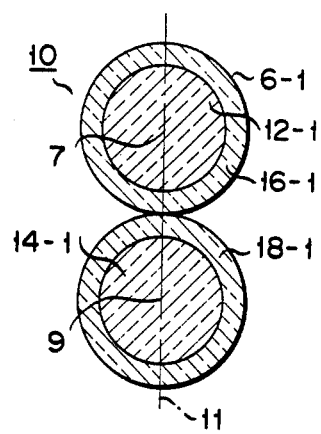
FIG. 2 is a cross sectional view taken along line II—II in FIG. 1.
Figure 3:
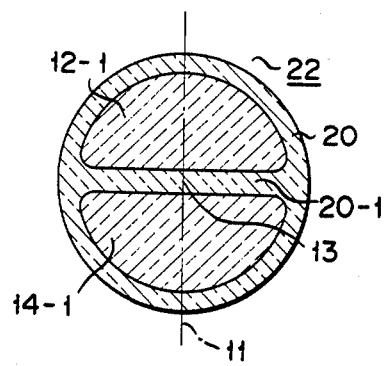
FIG. 3 is a cross sectional view taken along line III—III of FIG. 1.

The first section 2 consists of an array portion 10 and a tapered portion 22. The array portion 10 is made up of the optical fibers 6-1 and 8-1. The fibers 6-1 and 8-1 are arranged as shown in FIG. 2, a cross sectional view of the optical power distributor taken along line II—II in FIG. 1. That is, they are arranged parallel in mutual contact, with their axes placed in substantially the same plane 11. In the array portion 10 the core 12-1 and cladding 16-1 of the optical fiber 6-1 and the core 14-1 and cladding 18-1 of the fiber 8-1 have a circular sectional profile. The tapered portion 22 is made up of the optical fibers 6-1 and 8-1 which are thermally fused together as shown in FIG. 3, a cross sectional view of the optical power distributor taken along line III—III in FIG. 1. In the tapered portion 22 the core 12-1 of the fiber 6-1 and the core 14-1 of the fiber 8-1 are covered with, and separated from each other by, a united cladding 20 and have an elliptic or semi-circular sectional profile symmetrical with respect to said plane 11 containing the axis 13 of the tapered portion 22. The united cladding 20 is formed by fusing the claddings 16-1 and 18-1. That portion 20-1 of the united cladding 20 which lies between the cores 12-1 and 14-1 will hereinafter called "partition cladding".

Figure 4:
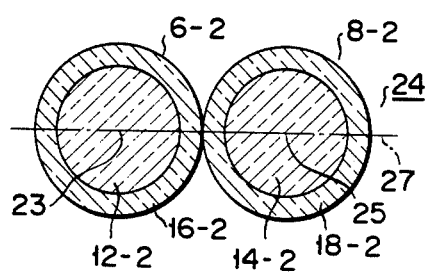
FIG. 4 is a cross sectional view taken along line IV—IV of FIG. 1.
Figure 5:
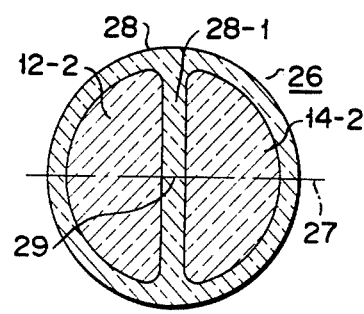
FIG. 5 is a cross sectional view taken along line V—V in FIG. 1.

The second section 4 is constituted in the same way as is the first section 2. It consists of an array portion 24 and a tapered portion 26, too. The array portion 24 is made up of the optical fibers 6-2 and 8-2. The fibers 6-2 and 8-2 are arranged as shown in FIG. 4, a cross sectional view of the optical power distributor taken along line IV—IV in FIG. 1. That is, they are arranged parallel in mutual contact, with their axes placed in substantially the same plane 27. In the array portion 24, the core 12-2 and cladding 16-2 of the optical fiber 6-2 and the core 14-2 and cladding 18-2 of the optical fiber 8-2 have a circular sectional profile. The tapered portion 26 is made up of the optical fibers 6-2 and 8-2 which are thermally fused together as shown in FIG. 5, a cross sectional view taken along line V—V in FIG. 1. In the tapered portion 26 the core 12-2 of the fiber 6-2 and the core 14-2 of the fiber 8-2 are covered with a united cladding 28, and separated from each other by a partition cladding 28-1 of the united cladding 28 and have a semi-circular sectional profile which is symmetrical with respect to the plane 27 containing the axis 29 of the tapered portion 26.

The tapered portion 22 of the first section 2 and the tapered portion 26 of the second section 4 are spliced, with their axes 13 and 29 aligned and with the planes 11 and 27 intersecting at right angle, thus forming a biconical taper waist which is symmetrical with respect to a splice plane 31. On the splice plane 31 the tapered portions 22 and 26 have the same circular sectional profile, and further the plane 11 containing axis 13 interacts at right angle with the plane 27 containing the axis 29. Thus, each core of one tapered portion overlaps both cores of the other tapered portion on the splice plane 31. More precisely, the core 12-1 of the tapered portion 22 overlaps both cores 12-2 and 14-2 of the tapered portion 26 and the partition cladding 28-1. And the core 14-1 of the tapered portion 22 overlaps both cores 12-2 and 14-2 of the tapered portion 26 and the partition cladding 28-1. By changing the angle at which the planes 11 and 27 intersect it can be adjusted how much each core of one section overlaps the respective cores of the other section. In the embodiment of FIG. 1 wherein the planes 11 and 27 intersect at a right angle, an optical energy applied to the optical fiber 6-1, for example, is divided into two substantially equal portions, which are then distributed to the fibers 6-2 and 8-2 of the second section 4, respectively.

Now referring to FIGS. 6 to 9, it will be described how the optical power distributor shown in FIG. 1 is manufactured.

Figure 9:
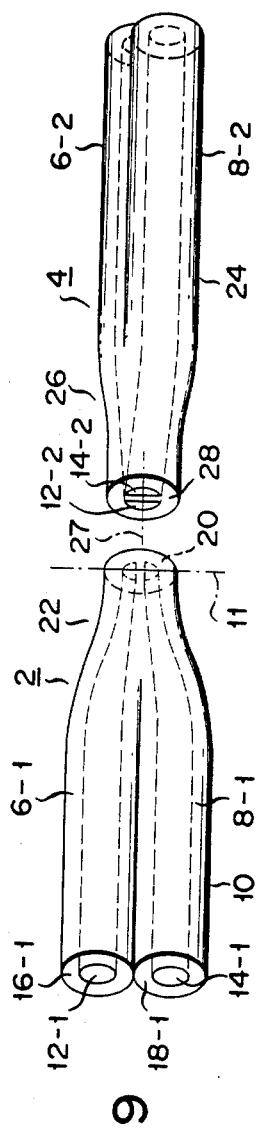

First, as illustrated in FIG. 6, a pair of optical fibers 6 and 8 are arranged parallel in mutual contact, with their axes placed in the same plane. Any desired portion of this pair of fibers is then heated and the fibers 6 and 8 are pulled at both ends. As a result, these claddings of the fibers 6 and 8 are thermally fused together and these cores of the fibers 6 and 8 are deformed, thus forming at said portion such a biconical taper waist 30 as shown in FIG. 7. The waist 30 is then cleaved at its thinnest portion, whereby the fibers 6 and 8 are cut to form two sections 2 and 4. The waist 30 is cleaved by the well known method for cutting optical fibers. That is, the waist 30 is first scratched, then bent and finally cleaved, as illustrated in FIG. 8. This done, the second section 4 is rotated by a predetermined angle, for example 90°, as shown in FIG. 9. The tapered portion of the second section 4 is then butted on the tapered portion of the first section 2. The tapered portions of the sections 2 and 4 thus butted on each other are heated and fused together, whereby the sections 2 and 4 are spliced to form such an optical power distributor as shown in FIG. 1.

The biconical tape waist 30 is formed in the same was as disclosed in detail in British Pat. No. 1,551,720.

So fabricated as described above, the optical power distributor of FIG. 1 can distribute optical power at a predetermined distribution ratio, no matter whether the optical power is higher order mode light or lower order mode light. This is because every core of one section, which has an elliptic sectional profile, overlaps all the cores of the other section which have also an elliptic sectional profile. More specifically, in the optical power distributor of FIG. 1 wherein one of the cores 12-1 and 14-1 overlaps both cores 12-2 and 14-2 substantially to the same extent, higher order mode light and lower order mode light are distributed in the following manner.

Most of lower order mode light introduced into the optical fiber 6-1 propagates in core mode until it reaches the splice plane 31. A greater portion of the core mode light which is directed to the cores 12-2, 14-2 is split at the splice plane 31 into two equal portions, which propagate through the cores 12-2 and 14-2, respectively, and which are thus distributed to the optical fibers 6-2 and 8-2, respectively. The remaining portion of the core mode light which is directed to the partition cladding 28-1 enters the cladding 28 of the tapered portion 26 and is therefore converted at the splice plane 31 into a cladding mode light. This cladding mode light is then reconverted at the tapered portion 26 into core mode light, which is transmitted through the cores 12-2 and 14-2.

High order more light introduced into the optical fiber 6-1 propagates in the core mode until it reaches the tapered portion 22. In the tapered portion 22 part of the higher mode light is converted into a cladding mode light and the other part of the higher order mode light is converted into the cladding mode by the deformed core 12-1 and 14-1 of the first section 2. The cladding mode light is then reconverted into a core mode light in the tapered portion 26 of the second section 4. The remaining higher order mode light transmitted in the core mode is subsequently split into two equal portions at the splice plane 3, which are distributed to the fibers 6-2 and 8-2 of the second section 4, respectively.

Since most of the cladding mode light produced in the above-mentioned manner can be reconverted into core mode light in the tapered portion 26, the optical power distributor of FIG. 1 distributes optical power with a small insertion power loss.

The step of forming the tapered portions 22 and 26 may be dispensed with. For example, two sections 2 and 4 may be prepared, each constituted by a pair of optical fibers 6 and 8 and having an end portion which is not tapered and in which the claddings of the fibers are thermally fused, forming one cladding and the cores of the fibers have a semi-circular sectional profile. The sectionals 2 and 4 thus fabricated may be spliced in the above-mentioned manner. An optical power distributor, if constituted by such separately prepared sections, however, has a larger insertion power loss than the optical power distributor shown in FIG. 1. This is because, unlike in the distributor of FIG. 1, all the cladding mode light is not converted into core mode light in the end portion of the second section 4 which is not tapered at all.

In the abovementioned embodiment the sections 2 and 4 are constituted each by two optical fibers. Instead, the sections 2 and 4 may be constituted by different numbers of fibers. For instance, the section 2 may be constituted by two fibers, while the section 4 by three fibers, as long as each core of the section 2 overlaps all the three cores of the section 4.

FIG. 10 illustrates a star coupler, another embodiment of this invention, which may be manufactured in the same method as described above and as illustrated in FIGS. 6 to 9. This star coupler consists of two sections 2 and 4, too. Each section is constituted by seven optical fibers 32, 34, 36, 40, 42 and 44. The sections 2 and 4 have tapered end portions 22 and 26, as shown in FIGS. 11 and 12, respectively. The tapered portions 22 and 26 are butted on such a way that every core of one section overlaps some of the seven cores of the other section. Like the optical power distributor of FIG. 1, the star coupler can distribute optical power at a predetermined ratio, no matter whether the optical power is higher order mode light or lower order mode light.

So fabricated as described above, the optical power distributor of this invention can distribute optical power at a predetermined ratio, no matter whether the optical power is higher order mode light or lower order mode light. This is because every core of one section, which has a flat sectional profile, overlaps all or some of the cores of the other section which have also an elongated sectional profile.

The power distribution ratio at which optical power is distributed from, for example, the optical fiber 6-1 to the optical fiber 6-2 and 8-2 depends upon how much the core 12-1 overlaps the individual cores 12-2 and 14-2.

Table 1 given below shows the characteristics of the optical power distributor shown in FIG. 1 (called "rotation-splice optical power distributor"), in which the second section 4 is rotated by 90° with respect to the first section 2. Table 1 also shows the characteristics of the optical power distributor disclosed in British Pat. No. 1,551,720 (called "biconical optical power distributor"), which has a biconical taper waist. Either distributor is constituted by two optical fibers and therefore has two input ports and two output ports. The optical fibers of these distributors have a core diameter of 80 microns, an outer diameter of 125 microns and a numerical aperture N.A. of 0.28.

TABLE

| Characteristics of Optical Power Distributors (in dB) | | | | |
|---|---|---|---|---|
| | | biconical optical power distributor | rotation-splice optical power distributor | |
| | | input port No. | | |
| | | 1 | 1 | 2 |
| launching NA 0.02 | insertion loss | 0.17 | 0.59 | 0.61 |
| | difference of power distribution | 5.20 | 0.05 | 0.07 |
| launching NA 0.3 | insertion loss | 0.69 | 1.35 | 1.38 |
| | difference of power distribution | 0.50 | 0.04 | 0.10 |

TABLE-continued

| Characteristics of Optical Power Distributors (in dB) | | |
|---|---|---|
| biconical optical power distributor | rotation-splice optical power distributor | |
| input port No. | | |
| 1 | 1 | 2 |
| taper ratio 3.9 | 2.0 | |

"Input port No." in the above table indicates which input port receives a signal light. "Input port No. 1" means optical fiber 6-1, and "input port No. 2" means optical fiber 8-1. Since the biconical optical power distributor exhibits substantially the same characteristics whichever input port receives a signal light, only "input port No. 1" is indicated in the Table. "Launching N.A." is the numerical aperture of light rays applied to the input ports. Light rays of launching N.A. of 0.02 are transmitted in lower order mode, and light rays of launching N.A. of 0.3 in higher order mode and lower order mode. "Insertion loss" is expressed as $-10 \log (P_3+P_4)/P_1$ or $-10 \log (P_3+P_4)/P_2$, where $P_1$ is the optical power applied to one of the input ports, $P_2$ is the optical power applied to the other input port, $P_3$ is the optical power projected from one of the output ports, and $P_4$ is the optical power projected from the other output port. The insertion loss is the ratio of optical power leak to the input optical power. A small insertion loss means a small optical power leak. "Difference of power distribution" is the ratio between $P_3$ and $P_4$ and is expressed as $|10 \log P_4/P_3|$. A small difference of power distribution means a small difference between $P_3$ and $P_4$. "Taper ratio" is the ratio between the diameter of the waist and the diameter of a circle having an area equal to the sum of the cross sectional areas of two fibers. The larger the taper ratio is, the smaller is the waist, and the smaller is the mechanical strength of the distributor.

The table shows that the optical power distributor shown in FIG. 1 has an insertion loss larger than that of the known distributor. The distributor of FIG. 1, however, has a difference of power distribution which is sufficiently small whichever light rays are applied to it, rays of lower order mode or rays of higher order mode. That is, it distributes either lower order mode light or higher order mode light to two output ports to substantially the equal degree.

Moreover, the tapered ratio can be either relatively large or small. If it is smaller than that of the known distributor, the distributor of this invention can be mechanically stronger than the known one.

As described above, this invention provides an optical power distributor and a method for manufacturing the same, which has a large mechanical strength and which can distribute optical power at a desired power distribution ratio.

What we claim is:

1. An optical power distributor comprising first and second sections each of which consists of optical fibers thermally fused at one end portion wherein said first section comprises at least two fibers and said second section comprises at least three fibers, said end portion consisting of a united cladding having a circular sectional profile, including cores having deformed relatively elongated sectional profiles and packed in the cladding, the centers of all of said sectional profiles of said cores in each of said first and second sections being colinear, and an intermediate cladding separating all of said cores, the end faces of said end portions butted on each other and spliced by means of thermal fusing in such a manner that at least one core of said first section overlaps at least two cores of said second section at a splice plane, whereby optical power is distributed through said splice plane.

2. The optical power distributor according to claim 1, wherein each of said end portions of said first and second sections is tapered, the tapered portions being coupled to each other to form a biconical taper waist in which input light rays are mixed.

3. The optical power distributor according to claim 1, wherein the end portion of said first section has a sectional profile which is substantially symmetrical with respect to a first plane passing the axis of said first section, and the fused end portion of said second section has a sectional profile which is substantially symmetrical with respect to a second plane passing the axis of said second section, said first and second planes intersecting with each other at substantially right angle.

4. A method for manufacturing optical power distributors comprising steps of:
preparing a first section consisting of at least two optical fibers each of which has a core and a cladding and which are thermally fused together at one end portion, said one end portion being tapered, and consisting of at least two cores having a relatively elongated sectional profile and a united cladding covering the cores;
preparing a second section consisting of at least three optical fibers, each of which has a core and a cladding and which are thermally fused together at one end portion, said one end portion being tapered and consisting of at least three cores having a relatively elongated sectional profile and a cladding covering the cores, wherein said optical fibers of said first and second sections are arranged colinearly during said fusing step; and
thermally fusing and splicing the tapered portions of said first and second sections, with the end faces thereof butted on each other, in such a manner that the cores of said first section each overlap all cores of said second section.

5. A method for manufacturing optical power distributors comprising steps of:
arranging at least three optical fibers having cores and cladding in side by side relationship and parallel in contact;
heating the optical fibers at a portion intermediate the fiber ends and pulling the optical fibers at both ends, thus forming a biconical taper waist;
cleaving the optical fibers at the waist into a first section and a second section;
aligning the axes of the first and second sections, rotating one of the first and second sections by a predetermined angle and butting the first and second sections on each other; and
heating the butting ends of the first and second sections so as to thermally fuse the first and second sections together.

6. The method according to claim 5, wherein said predetermined angle is about 90°.

7. An optical power distributor manufactured according to the method of claims 4 or 5.

* * * * *